United States Patent
MacGillivray

(10) Patent No.: US 10,698,561 B2
(45) Date of Patent: Jun. 30, 2020

(54) INTELLIGENT COMMAND BATCHING IN AN AUGMENTED AND/OR VIRTUAL REALITY ENVIRONMENT

(71) Applicant: GOOGLE INC., Mountain View, CA (US)

(72) Inventor: Ian MacGillivray, New York, NY (US)

(73) Assignee: GOOGLE LLC, Mountain View, CA (US)

(*) Notice: Subject to any disclaimer, the term of this patent is extended or adjusted under 35 U.S.C. 154(b) by 414 days.

(21) Appl. No.: 15/620,326

(22) Filed: Jun. 12, 2017

(65) Prior Publication Data
US 2018/0356956 A1 Dec. 13, 2018

(51) Int. Cl.
| | |
|---|---|
| G06F 3/0481 | (2013.01) |
| G06F 9/46 | (2006.01) |
| G06F 3/01 | (2006.01) |
| G06T 11/00 | (2006.01) |
| G06T 15/20 | (2011.01) |
| G06T 19/00 | (2011.01) |
| G06F 3/0346 | (2013.01) |

(52) U.S. Cl.
CPC .......... *G06F 3/04815* (2013.01); *G06F 3/011* (2013.01); *G06F 9/46* (2013.01); *G06T 11/001* (2013.01); *G06T 15/20* (2013.01); *G06F 3/012* (2013.01); *G06F 3/013* (2013.01); *G06F 3/017* (2013.01); *G06F 3/0346* (2013.01); *G06T 19/006* (2013.01); *G06T 2219/024* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,550,563 A | * | 8/1996 | Matheny | G06F 3/0481 345/157 |
| 5,659,747 A | * | 8/1997 | Nakajima | G06F 9/451 713/1 |
| 5,835,086 A | * | 11/1998 | Bradstreet | G06T 11/001 345/581 |
| 5,890,181 A | * | 3/1999 | Selesky | C07D 307/93 715/255 |
| 6,111,575 A | * | 8/2000 | Martinez | G06F 9/451 715/810 |

(Continued)

OTHER PUBLICATIONS

International Search Report and Written Opinion for International Application No. PCT/US2018/014161, dated May 23, 2018, 16 pages.

*Primary Examiner* — Hien L Duong
(74) *Attorney, Agent, or Firm* — Brake Hughes Bellermann LLP

(57) ABSTRACT

In an augmented reality and/or a virtual reality system, detected commands may be intelligently batched to preserve the relative order of the batched commands while maintaining a fluid virtual experience for the user. Commands detected in the virtual environment may be assigned to a batch command, of a plurality of batch commands, based on a temporal window in which the command(s) are detected, based on an operational type associated with the command(s), or based on a spatial position at which the command is detected in the virtual environment. The commands included in a batched set of commands may be executed in response to an un-do command and/or a re-do command and/or a re-play command.

21 Claims, 12 Drawing Sheets

(56) References Cited

U.S. PATENT DOCUMENTS

| | | | | |
|---|---|---|---|---|
| 6,259,446 B1* | 7/2001 | Matheny | G06F 3/0481 | 715/764 |
| 6,523,134 B2* | 2/2003 | Korenshtein | G06F 9/451 | 714/16 |
| 6,527,812 B1* | 3/2003 | Bradstreet | G06F 9/451 | 715/210 |
| 7,030,861 B1* | 4/2006 | Westerman | G06F 3/04883 | 345/173 |
| 8,683,469 B2 | 3/2014 | Molaro et al. | | |
| 9,616,338 B1 | 4/2017 | Hooper et al. | | |
| 9,817,805 B1* | 11/2017 | Markman | G06Q 10/103 | |
| 10,169,054 B2* | 1/2019 | Dhupar | G06F 9/451 | |
| 2004/0068678 A1* | 4/2004 | Li | G06F 11/3612 | 714/38.1 |
| 2005/0081105 A1* | 4/2005 | Wedel | G06F 9/451 | 714/38.14 |
| 2006/0031187 A1* | 2/2006 | Pyrce | G06F 3/04815 | |
| 2006/0129884 A1* | 6/2006 | Clark | G06F 17/24 | 714/15 |
| 2007/0192383 A1* | 8/2007 | Harahan | G06F 16/2379 | |
| 2008/0134161 A1* | 6/2008 | Chamieh | G06F 9/4488 | 717/166 |
| 2008/0147416 A1* | 6/2008 | Hill | G06F 8/36 | 717/107 |
| 2009/0310816 A1* | 12/2009 | Freire | G06F 16/22 | 382/100 |
| 2010/0235726 A1* | 9/2010 | Ording | G06F 1/1626 | 715/234 |
| 2011/0181598 A1* | 7/2011 | O'Neall | G06T 11/206 | 345/440 |
| 2012/0029661 A1* | 2/2012 | Jones | G05B 19/0426 | 700/17 |
| 2012/0032877 A1* | 2/2012 | Watkins, Jr. | G06F 1/1624 | 345/156 |
| 2012/0047434 A1* | 2/2012 | Ginetti | G06F 40/166 | 715/255 |
| 2013/0120439 A1 | 5/2013 | Harris et al. | | |
| 2014/0149944 A1* | 5/2014 | Duplessis | G06F 3/04845 | 715/849 |
| 2014/0194211 A1 | 7/2014 | Chimes et al. | | |
| 2015/0039566 A1* | 2/2015 | Baumann | G06F 9/451 | 707/684 |
| 2015/0058753 A1* | 2/2015 | Anderson | G06F 3/04812 | 715/753 |
| 2015/0165323 A1* | 6/2015 | Major | A63F 13/63 | 463/31 |
| 2015/0264113 A1* | 9/2015 | Nickens | H04L 67/22 | 709/219 |
| 2016/0241676 A1* | 8/2016 | Armstrong | G06F 16/2358 | |
| 2017/0357675 A1* | 12/2017 | Underwood | G06F 16/93 | |

\* cited by examiner

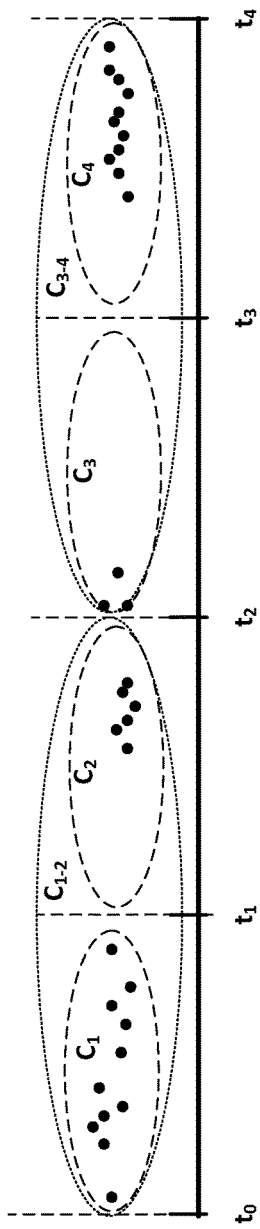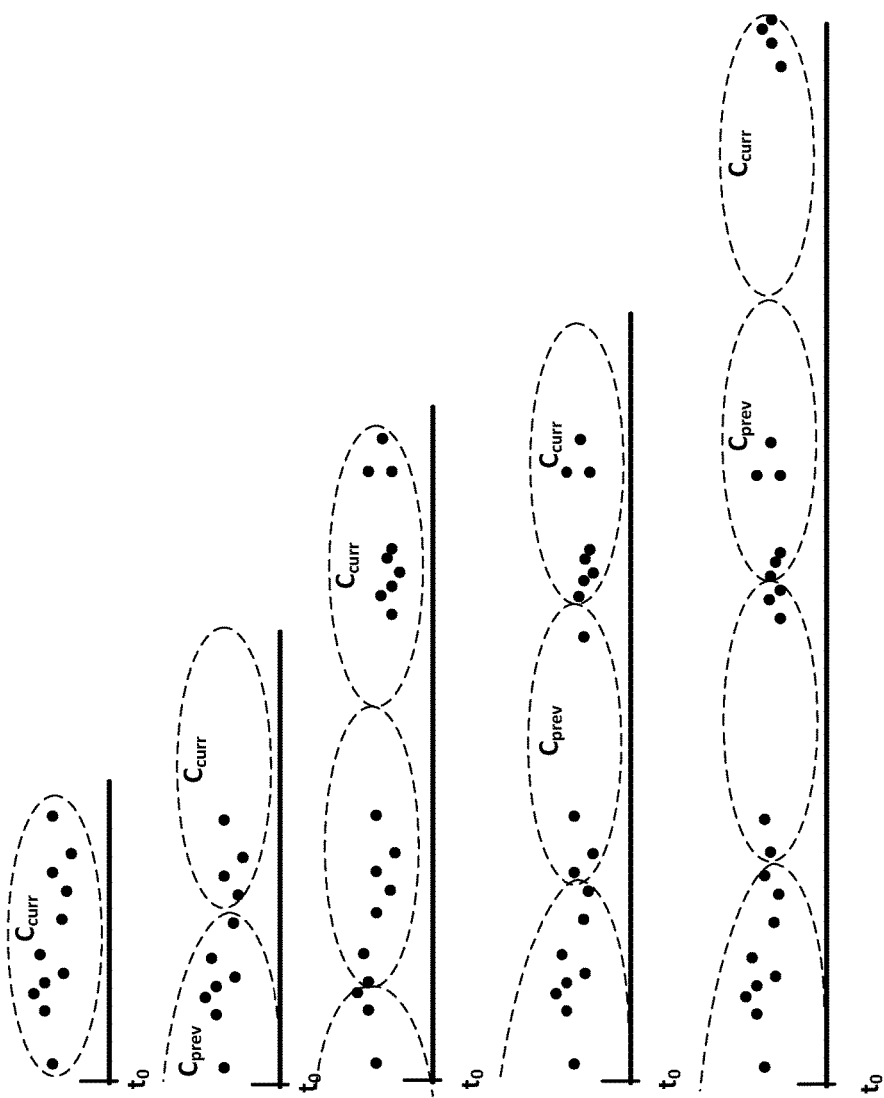

_US 10,698,561 B2_

INTELLIGENT COMMAND BATCHING IN AN AUGMENTED AND/OR VIRTUAL REALITY ENVIRONMENT

FIELD

This document relates, generally, to the batching and execution of commands in an augmented reality and/or a virtual reality environment.

BACKGROUND

An augmented reality (AR) and/or virtual reality (VR) system may generate an immersive, three-dimensional (3D) virtual environment. A user may interact with virtual objects, elements, features and the like in this virtual environment using various electronic devices, such as, for example, a helmet or other head mounted device including a display, glasses or goggles that a user looks through when viewing a display device, one or more handheld electronic devices such as controllers, joysticks and the like, gloves fitted with sensors, keyboards, mouse, and other electronic devices.

SUMMARY

In one aspect, a method may include detecting, in a three dimensional (3D) virtual environment generated by a computing device, a plurality of commands to be executed in the virtual environment; executing the plurality of commands; and assigning each command of the plurality of commands to a batch, of a plurality of batches, based on at least one of a moving temporal window associated with the detection of the command, a classification of an operation to be executed in connection with the command, or a spatial position in the virtual environment associated with the detection of the command. The method may also include executing a supplementary command associated with at least one of the plurality of batches of commands and executing the supplementary command.

In another aspect, a computer program product may be embodied on a non-transitory computer readable medium, the computer readable medium having stored thereon a sequence of instructions. When executed by a processor, the instructions may cause the processor to execute a method, the method including generating a three dimensional (3D) virtual environment; detecting a plurality of commands to be executed in the virtual environment; and assigning each command of the plurality of commands to a batch, of a plurality of batches, based on at least one of a moving temporal window associated with the detection of the command, a classification of an operation to be executed in connection with the command, or a spatial position in the virtual environment associated with the detection of the command. The method may also include detecting a supplementary command associated with at least one of the plurality of batches of commands; and executing the supplementary command.

The details of one or more implementations are set forth in the accompanying drawings and the description below. Other features will be apparent from the description and drawings, and from the claims.

BRIEF DESCRIPTION OF THE DRAWINGS

FIGS. 5A-5B illustrate the intelligent assignment of commands to batches based on a temporal window in which the commands are detected, in accordance with implementations as described herein.

DETAILED DESCRIPTION

Figure 1:
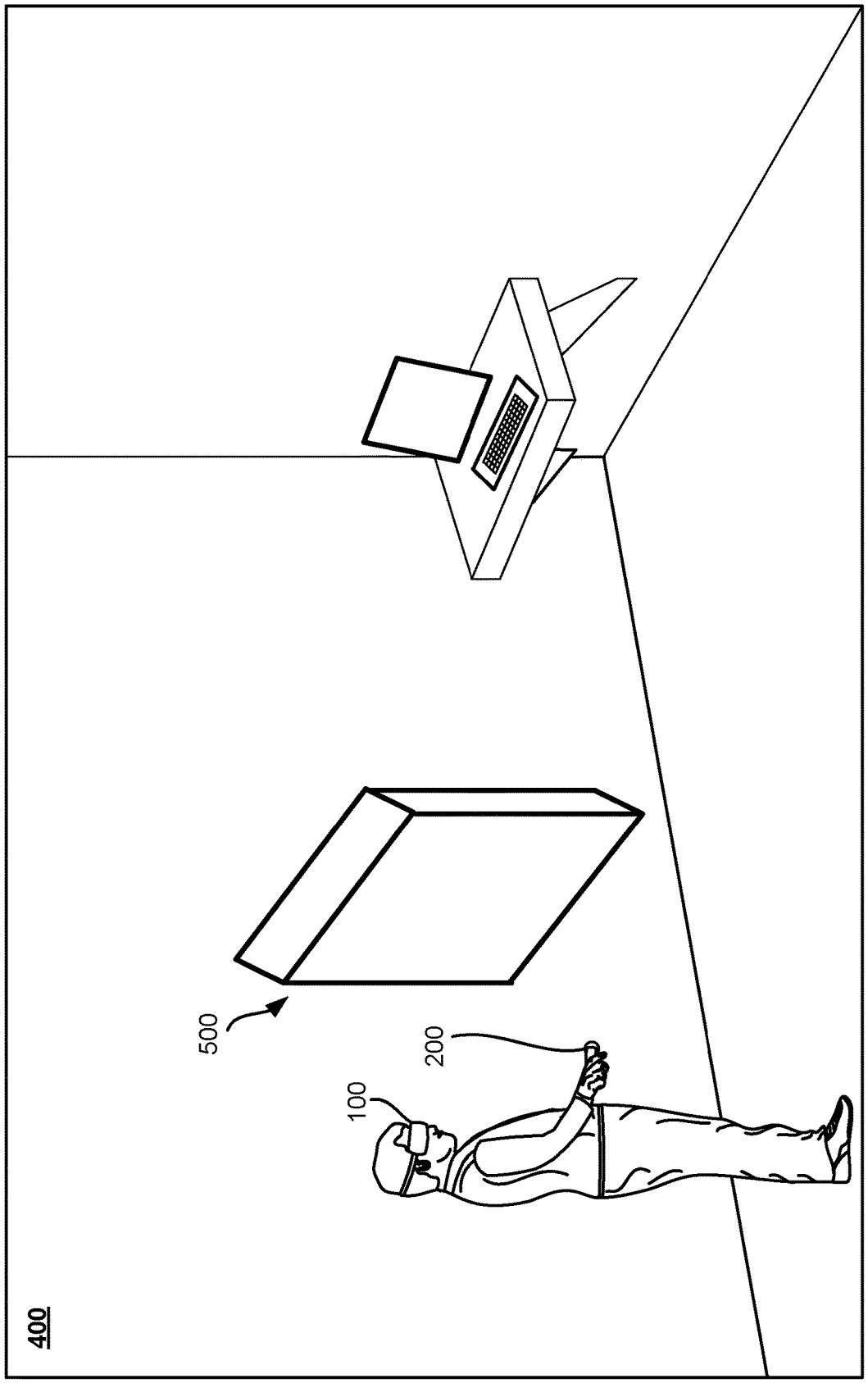
FIG. 1 is an example implementation of an augmented and/or virtual reality system including a head mounted display device in communication with external input devices, in accordance with implementations as described herein.

One or more users immersed in an augmented and/or a virtual reality environment wearing, for example, a head mounted display (HMD) device may explore the virtual environment and interact with the virtual environment through various different types of inputs. These inputs may include, for example, manipulation of the HMD and/or one or more external electronic device(s) operably coupled with the HMD, and/or hand/arm gestures, eye/head gaze, and the like. Input of multiple user commands in this manner may allow for the input of commands in a relatively natural manner in the virtual environment, thus enhancing the user's experience in the virtual environment. However, the reversal of commands received in this manner, and/or the re-play or re-execution of these commands, and/or the merging of commands received from multiple users directed to the same virtual object, may be complicated for inputs in the virtual environment received in this manner, generating a somewhat disjointed, or discontinuous, user experience. This may be further complicated with multiple users providing inputs in the virtual environment, particularly when the inputs are directed for execution in relation to the same virtual object in the virtual environment. The ability to intelligently batch, or group, commands in the virtual environment, may allow for the reversal and/or re-execution and/or re-play of commands in the virtual environment, in relatively natural manner that enhances, rather than detracts from, the user's experience in the virtual environment.

A system and method, in accordance with implementations described herein, may intelligently determine which commands, received in an augmented and/or virtual reality environment, may be included in a batched command to preserve the relative order of the batched commands while maintaining a fluid virtual experience for the user. In some implementations, in response to a first supplementary command, such as, for example, an un-do command, the execution of the commands included in the batched command may be reversed. In some implementations, in response to a second supplementary command, for example, a re-do command, the (previously reversed commands) may be re-executed. In some implementations, in response to a third supplementary command, for example, a re-play command, one or more batches of commands, for example, an identified range of batches of commands, may be re-played, or re-executed, for example, sequentially re-executed. In some implementations, commands received in the virtual environment may be assigned to a batch command based on a temporal window in which the command(s) are detected in the virtual environment. In some implementations, the temporal window may be a moving temporal window. In some implementations, commands received in the virtual environment may be assigned to a batch command based on an operational type associated with the command(s). In some implementations, command(s) received in the virtual environment may be assigned to a batch command based on a spatial position at which the command is detected in the virtual environment.

FIG. 1 is a third person view of a user wearing an HMD 100. In this example third person view, the user is in a physical space 400, in which the augmented/virtual reality system is operable. In this example third person view, the user is engaged in a virtual environment, displayed on a display of the HMD 100. In this arrangement, the virtual environment is visible to the user within the HMD 100, for example, on a display of the HMD 100. Simply for ease of discussion and illustration, an example representation 500 of the virtual environment (or a virtual object included in the virtual environment) is shown outside the confines of the HMD 100 in FIG. 1.

In some implementations, the user may interact with one or more external computing devices 200 that may be operably coupled with, and communicate with, the HMD 100. In the example shown in FIG. 1, the external computing device 200 is a handheld electronic device 200, or handheld controller 200, that may be manipulated by the user to interact with the virtual environment and/or implement commands for execution in the virtual environment.

Implementation of commands to be executed in the virtual environment using the external computing device 200 may be detected based on physical manipulation of manipulation devices of the computing device 200, movement of the computing device 200 that is tracked by the system, and the like. In some implementations, commands to be executed in the virtual environment may be detected based on physical movement of the user, such as, for example, hand/arm movement, head movement, walking and the like. In some implementations, commands to be executed in the virtual environment may be detected based on head and/or eye gaze direction and/or movement. In some implementations, various different types and/or combinations of types, of user commands may be detected by the system as user inputs for execution in the virtual environment.

Figure 2A:
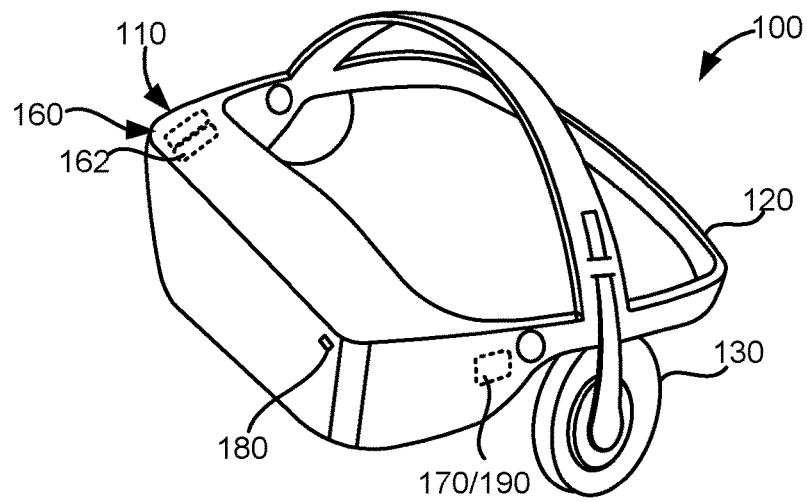
FIGS. 2A and 2B are perspective views of an example head mounted display device, in accordance with implementations as described herein.
Figure 2B:
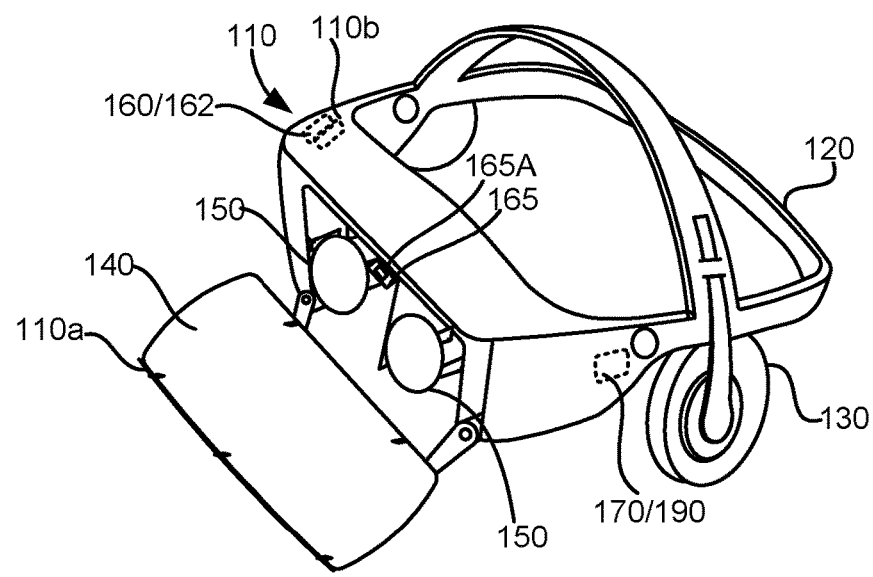

FIGS. 2A and 2B are perspective views of an example HMD, such as, for example, the HMD 100 worn by the user in the example shown in FIG. 1. The HMD 100 may include a housing 110 coupled to a frame 120. An audio output device 130 including, for example, speakers mounted in headphones, may be coupled to the frame 120. In FIG. 2B, a front portion 110a of the housing 110 is rotated away from a base portion 110b of the housing 110 so that some of the components received in the housing 110 are visible. A display 140 may be mounted on an interior facing side of the front portion 110a of the housing 110. In some implementations, the display 140 may be included in an electronic device, such as, for example, a smartphone, that is removably coupled in the housing 110. Lenses 150 may be mounted in the housing 110, between the user's eyes and the display 140 when the front portion 110a is in the closed position against the base portion 110b of the housing 110. The HMD 100 may include a sensing system 160 including various sensors and a control system 170 including a processor 190 and various control system devices to facilitate operation of the HMD 100.

For example, in some implementations, the sensing system 160 may include an inertial measurement unit (IMU) 162 including various different types of sensors such as, for example, an accelerometer, a gyroscope, a magnetometer, and other such sensors. A position and orientation of the HMD 100 may be detected and tracked based on data provided by the sensors included in the IMU 162. The detected position and orientation of the HMD 100 may allow the system to in turn, detect and track the user's head gaze direction and movement. In some implementations, the position and/or orientation of the HMD 100, and corresponding head gaze direction and/or movement, may be translated into corresponding user command(s) in the virtual environment.

In some implementations, the HMD 100 may include a gaze tracking device 165 including, for example, one or more sensors 165A, to detect and track eye gaze direction and movement. Images captured by the sensor(s) 165A may be processed to detect and track direction and movement of the user's eye gaze, and the detected and tracked eye gaze may be processed as a user input to be translated into a corresponding interaction in the immersive virtual experience. A camera 180 may capture still and/or moving images that may be used to help track a physical position of the user and/or other external devices in communication with/operably coupled with the HMD 100. The captured images may also be displayed to the user on the display 140 in a pass through mode.

Figure 3:
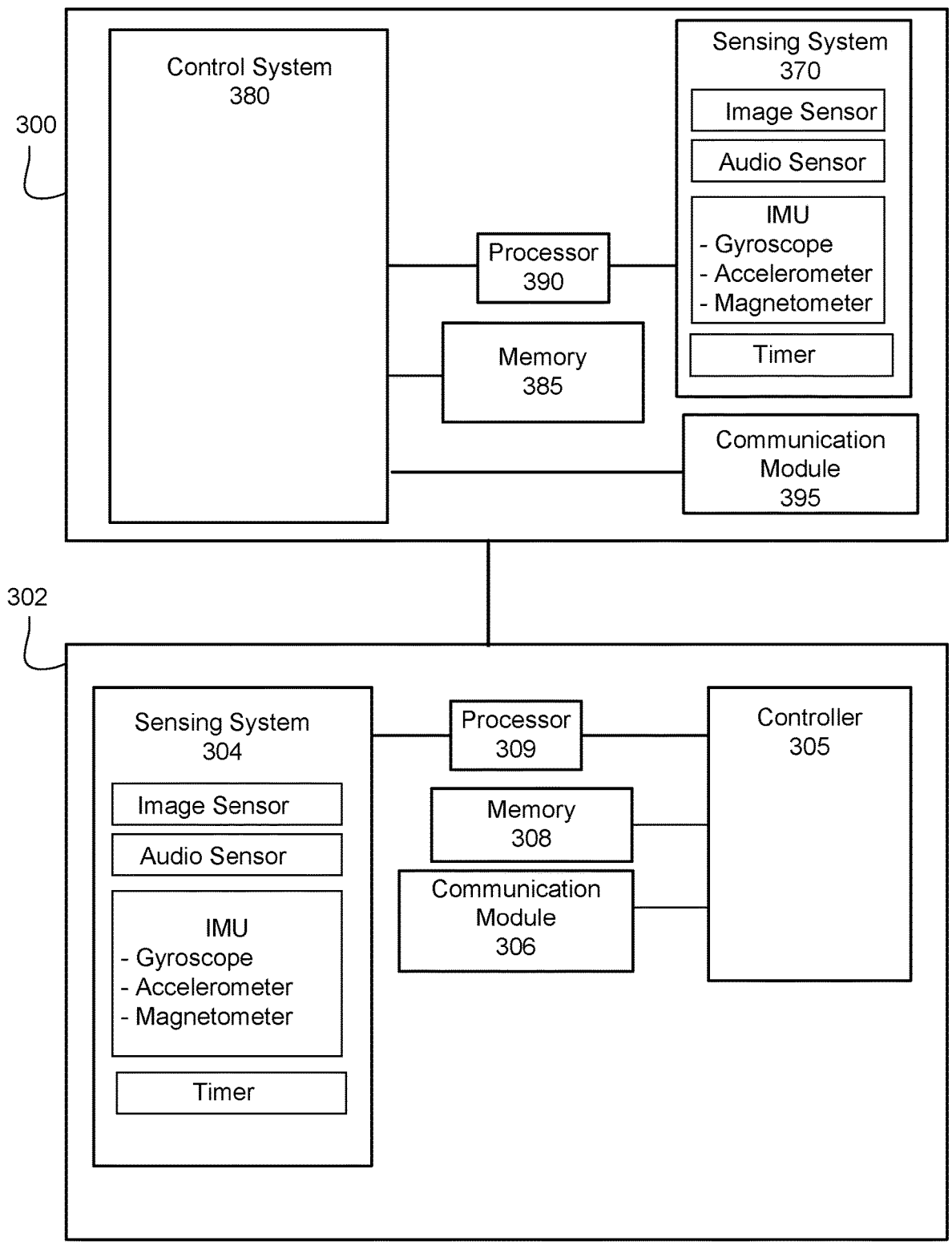
FIG. 3 is a block diagram of an augmented and/or virtual reality system, in accordance with implementations as described herein.

A block diagram of a system, in accordance with implementations described herein, is shown in FIG. 3. The system may include a first electronic device 300 (such as, for example, an HMD as described above with respect to FIGS. 1 and 2A-2B), and at least one second electronic device 302 (such as, for example, a handheld electronic device as described above with respect to FIG. 1, or other external device) in communication with the first electronic device 300.

The first electronic device 300 may include a sensing system 370 and a control system 380, which may be similar to the sensing system 160 and the control system 170, respectively, shown in FIGS. 2A and 2B. The sensing system 370 may include different types of sensors, including, for example, a light sensor, an audio sensor, an image sensor, a distance and/or proximity sensor, an IMU including, for example, a gyroscope, an accelerometer, a magnetometer and the like, a timer, and/or other sensors and/or different combination(s) of sensors. The control system 380 may include, for example, a power/pause control device, audio and video control devices, an optical control device, a transition control device, and/or other such devices and/or different combination(s) of devices. The sensing system 370 and/or the control system 380 may include more, or fewer, devices, depending on a particular implementation. The elements included in the sensing system 360 and/or the control system 370 may have a different physical arrangement (e.g., different physical location) within, for example, an HMD other than the HMD 100 shown in FIGS. 2A and 2B. The first electronic device 300 may also include a memory 385, and a processor 390 in communication with the sensing system 370 and the control system 380. The processor 390 may process inputs received from the sensing system 370, as well as from other external sources such as, for example, the second electronic device 302, and execute instructions corresponding to the detected inputs. The first electronic device 300 may also include a communication module 395 providing for communication between the first electronic device 300 and other, external computing devices, such as, for example, the second electronic device 302 and other computing devices involved in handling system related information.

The second electronic device 302 may include a communication module 306 providing for communication and data exchange between the second electronic device 302 and another device, such as, for example, the first electronic device 300. In some implementations, depending on a particular configuration of the second electronic device 302 (i.e., a handheld electronic device or controller, versus a keyboard or a mouse), the second electronic device 302 may include a sensing system 304 including, for example, an image sensor and an audio sensor, such as is included in, for example, a camera and microphone, an IMU, a timer, a touch sensor such as is included in a touch sensitive surface of a handheld electronic device, or smartphone, and other such sensors and/or different combination(s) of sensors. A processor 309 may be in communication with the sensing system 304 and a controller 305 of the second electronic device 302, the controller 305 having access to a memory 308 and controlling overall operation of the second electronic device 302.

FIGS. 4A-4E illustrate an example implementation, in which the system may detect one or more user commands in an augmented and/or virtual reality environment, and may intelligently assign the detected command(s) to an appropriate batch command based on one or more characteristics associated with the detected command(s). FIGS. 4A-4E are third person views of the user, wearing the HMD 100, in a physical environment 400, interacting with example virtual objects 520, 540 in a virtual environment 500. As noted above, in this example implementation, virtual elements of the virtual environment 500 are shown outside of the confines of the HMD 100, simply for ease of discussion and illustration.

In the painting example to be described with respect to FIGS. 4A-4E, each of the relatively small, incremental gestures implemented by the user in painting a particular portion of a virtual element in the virtual environment may be detected by the system and recorded as an individual command. These individual commands, corresponding to the small, incremental gestures associated with the painting of the virtual object in this example, may be batched, as shown in FIG. 5A. FIG. 5A illustrates a plurality of batches C1, C2, C3 and C4 of commands detected over time in the virtual environment 500. In this example, each of the dots represents a relatively small, incremental painting gesture corresponding to an individual command. Each of these dots representing an individual command within the respective batches C1, C2, C3 and C4 could be shown on the same line, but are illustrated in FIG. 5A in a slightly spread manner in the Y-direction, for clarity.

Figure 4A:
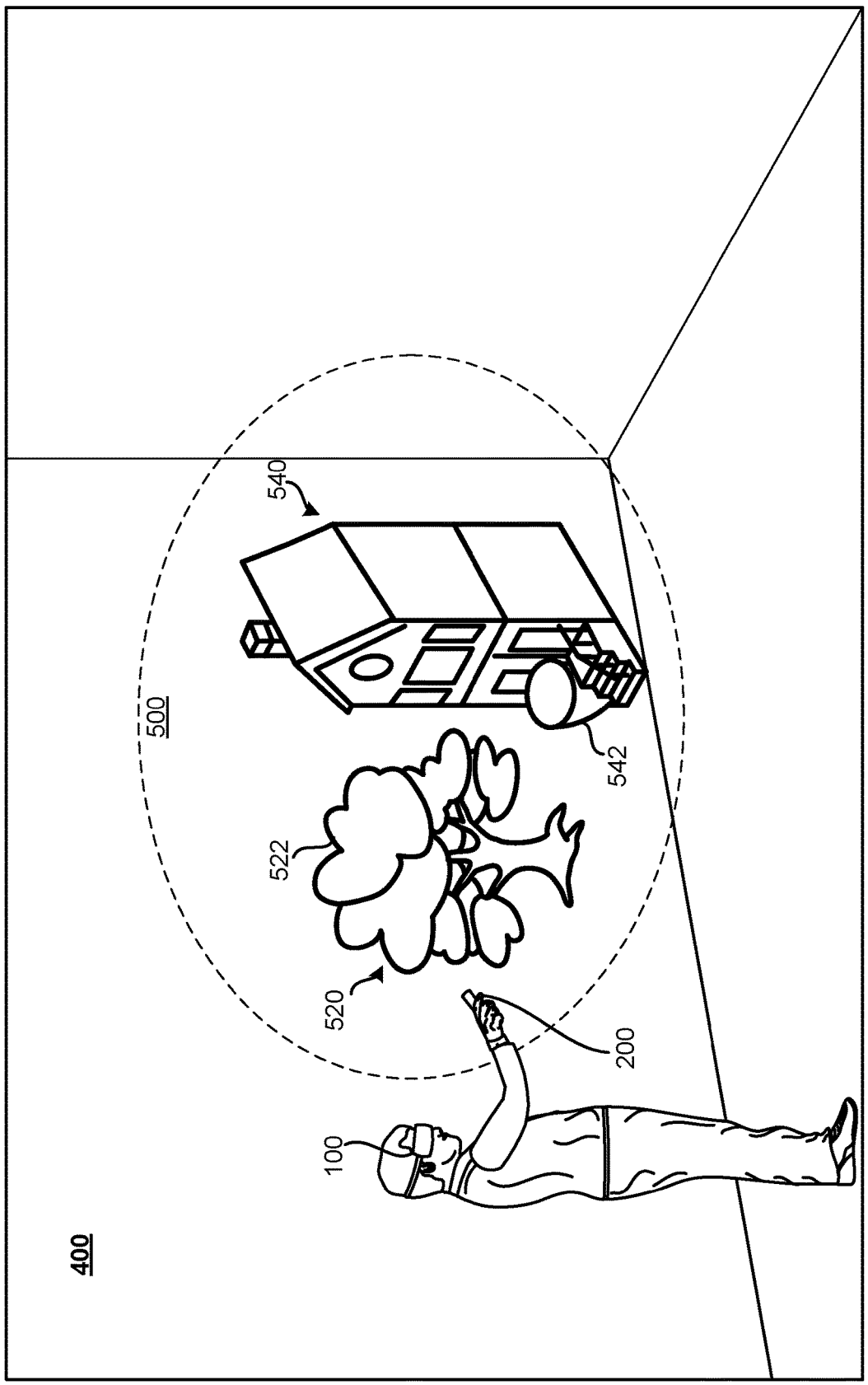
FIGS. 4A-4E illustrate a system for intelligently assigning commands to a batch command in an augmented and/or virtual reality environment, in accordance with implementations as described herein.
Figure 4B:
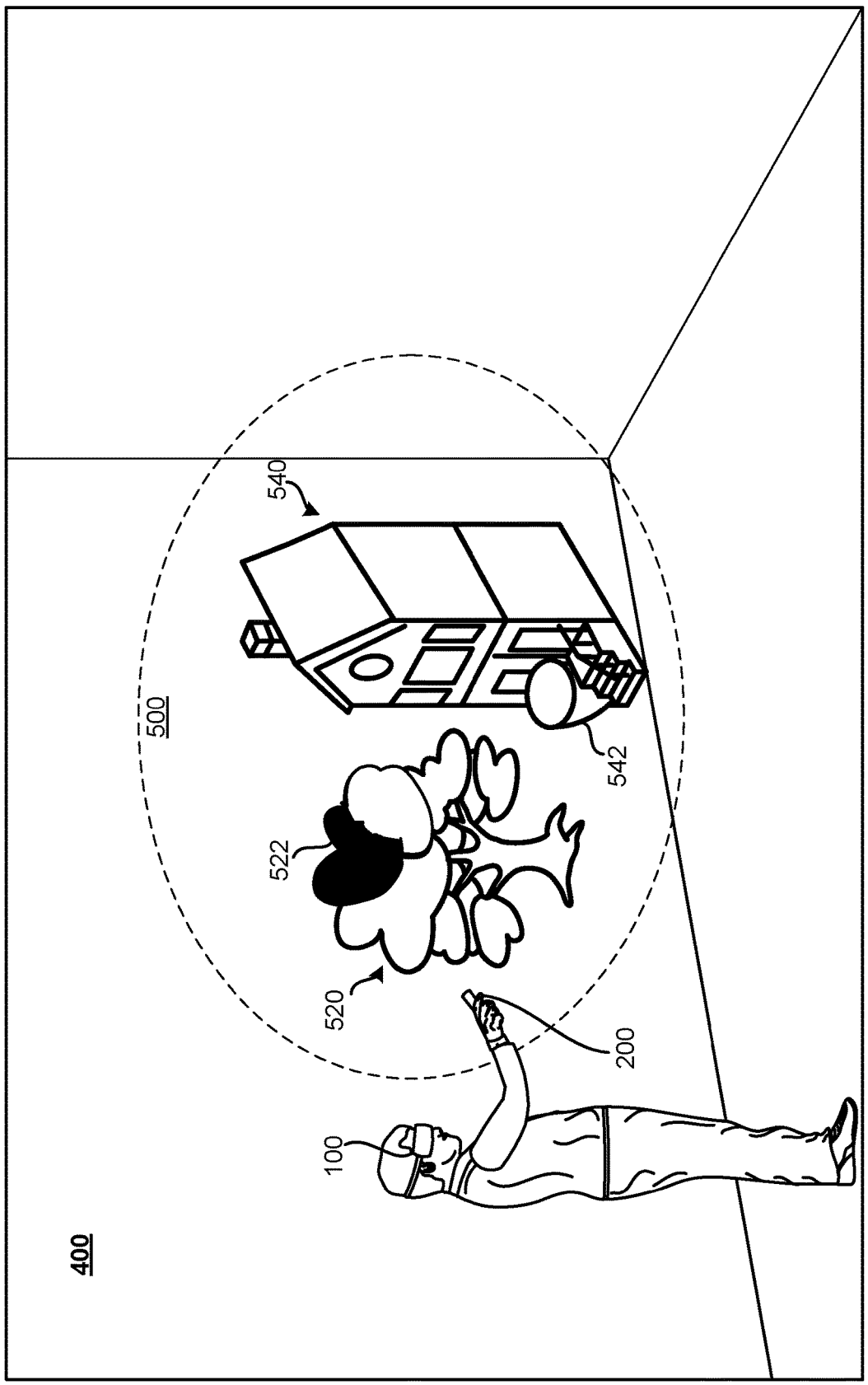

As shown in FIG. 4A, the example virtual environment 500 may include one or more virtual objects, such as, for example, virtual objects 520 and 540. The user may interact with the virtual objects 520, 540 using a variety of different input methods, as described above. For example, the user may interact with the virtual objects 520, 540 through hand/arm gestures, head/eye gaze direction and movement, through manipulation and/or movement of the handheld controller 200, and other types of user input methods and/or combinations thereof. In FIG. 4B, the user has initiated interaction with the first virtual object 520. That is, in FIG. 4B, the user has initiated virtual painting of a particular virtual element 522 of the virtual object 520. In FIG. 4B, the virtual element 522 of the virtual object 520 is partially painted. This partial painting of the virtual element 522 in going from FIG. 4A to FIG. 4B may include, for example, a plurality of commands included in a batch C1 of commands as shown in FIG. 5A, corresponding to a plurality of relatively small, incremental gestures implemented by the user.

Figure 4C:
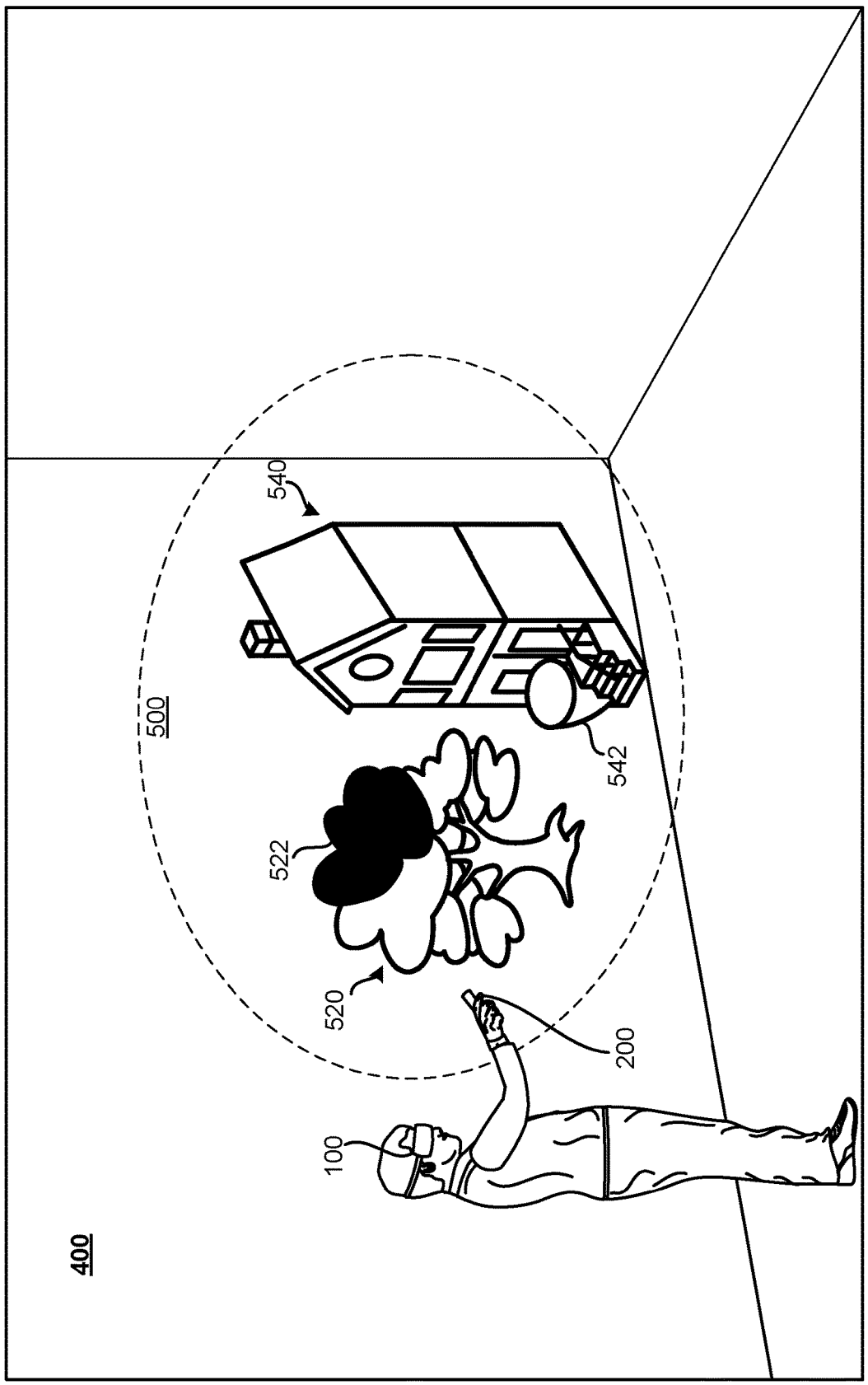

In FIG. 4C, the user has completed the interaction with the first virtual object 520, or completed the virtual painting of the virtual element 522 of the virtual object 520. This continued painting of the virtual element 522 in going from FIG. 4B to FIG. 4C may include, for example, a batch C2 of commands, as shown in FIG. 5A, corresponding to a plurality of relatively small, incremental gestures implemented by the user.

The example virtual painting of the virtual element 522 of the virtual object 520 shown in FIGS. 4A-4C may be initiated in response to, for example, a selection made with a hand/arm gesture and/or a gesture implemented through the handheld controller 200 and/or a manipulation of a device of the controller 200. The painting may then be accomplished through, for example, a swiping gesture of the user's hand/arm in an area corresponding to the virtual element 522 (for example, after selecting a paint option), through a swiping gesture of the handheld controller 200 in the area corresponding to the virtual element 522, and the like. These gestures may correspond to a plurality of commands, such as, for example, the batches C1 and C2 of commands, each of the batches C1 and C2 including commands respectively corresponding to small, incremental gestures, as described above. Completion may be detected by, for example, movement (of the user's hand/arm and/or the handheld controller 200) outside of a designated painting area of the selected virtual element 522 of the virtual object 520, manipulation of the controller 200 (for example, release of a manipulation device of the controller 200), and the like.

Figure 4D:
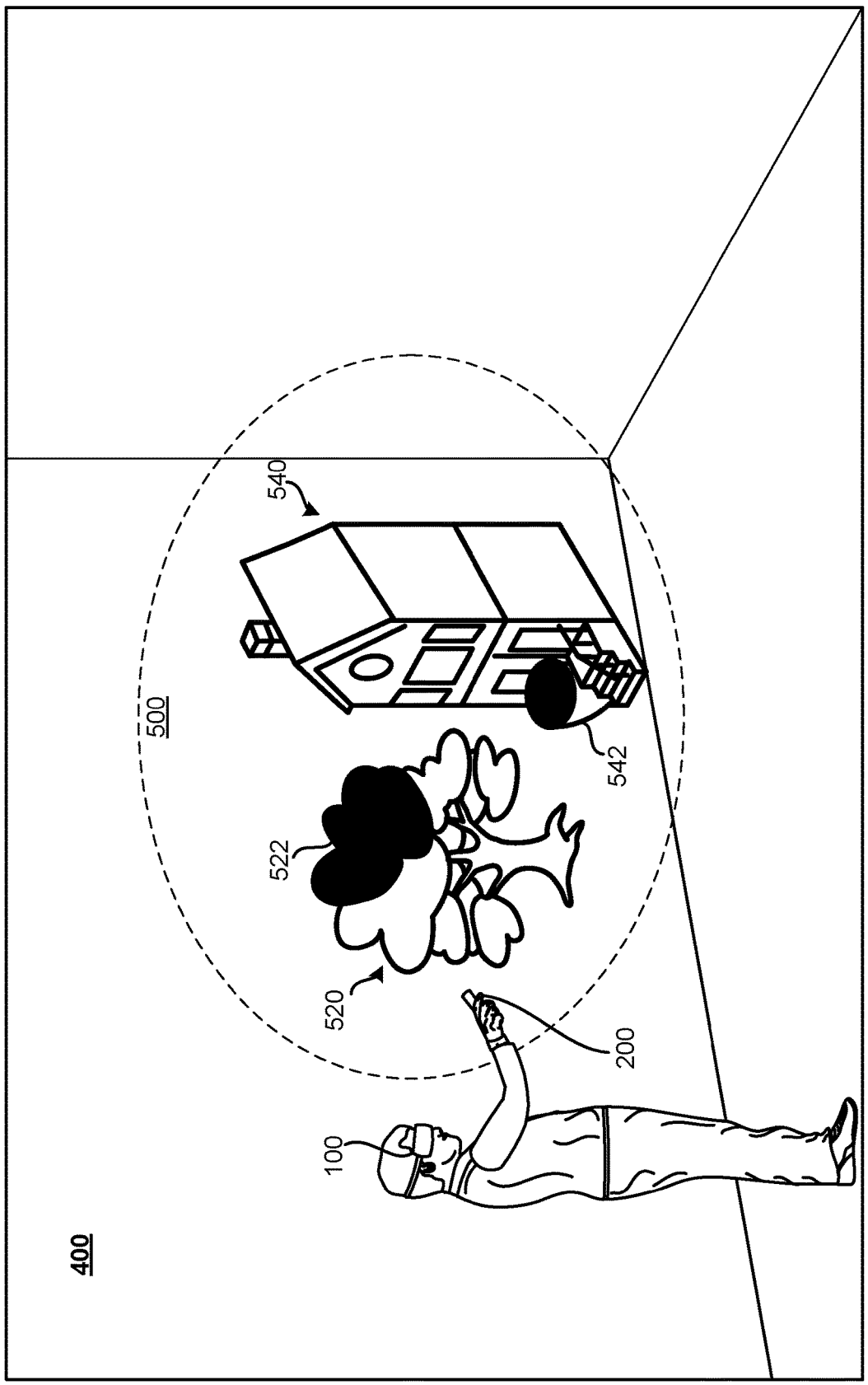
Figure 4E:
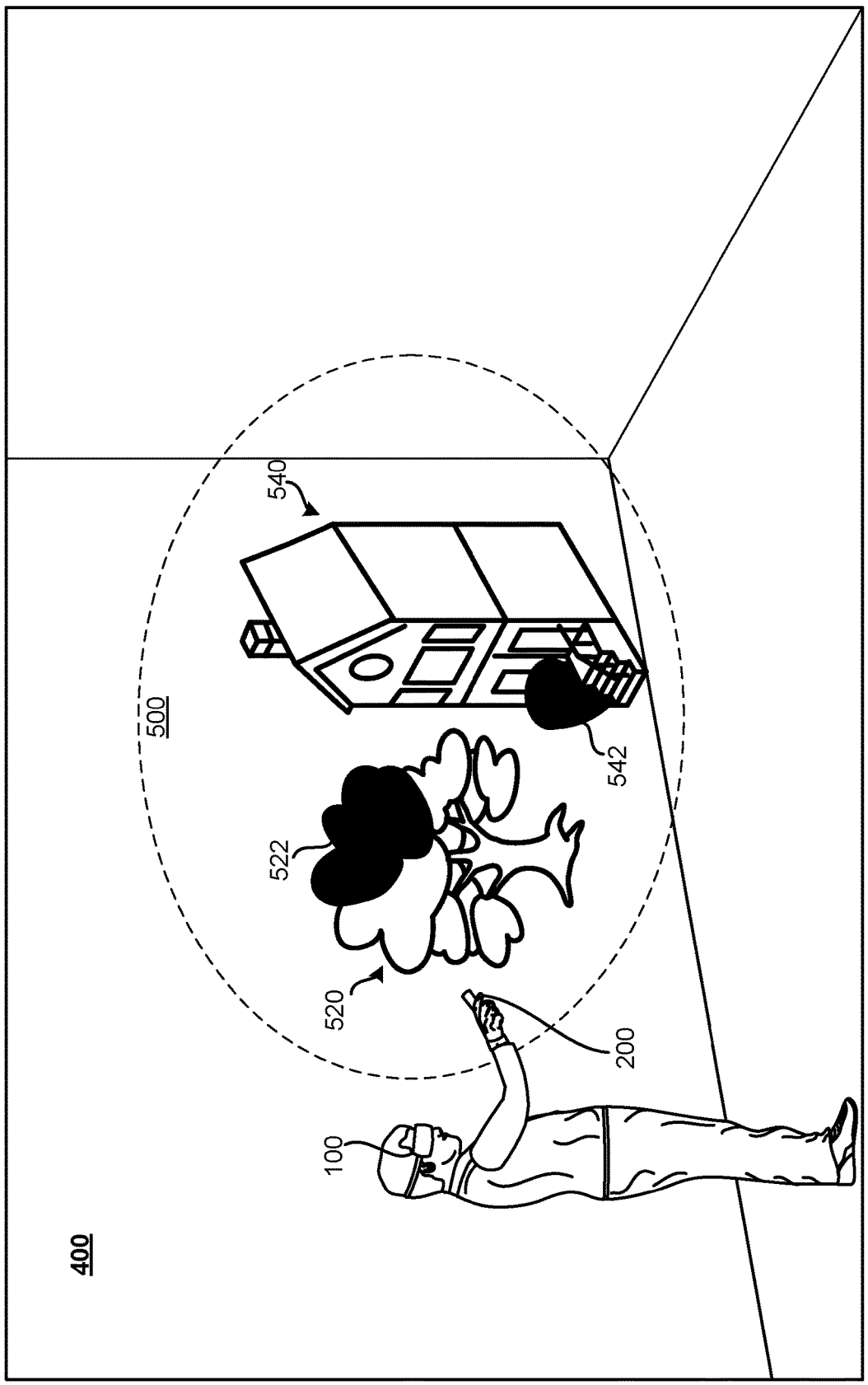

The user may initiate interaction with another virtual object, for example, the virtual object 540, as shown in FIG. 4D. For example, the user may initiate a paint command to virtually paint a virtual element 542 of the virtual object 540. In FIG. 4D, the virtual element 542 of the virtual object 540 is partially painted. This partial painting of the virtual element 542 in going from FIG. 4C to FIG. 4D may include, for example, a batch C3 of commands, as shown in FIG. 5A, corresponding to a plurality of relatively small, incremental gestures implemented by the user. In FIG. 4E, the user has completed the painting of the virtual element 542 of the virtual object 540. This continued painting of the virtual element 542 in going from FIG. 4D to FIG. 4E may include, for example, a batch C4 of commands, as shown in FIG. 5A, corresponding to a plurality of relatively small, incremental gestures implemented by the user. Painting of the virtual element 542 of the virtual object 540 may be performed in a manner as described above with respect to the painting of the virtual element 522 of the virtual object 520.

In the example shown in FIGS. 4A-4E, a series of natural hand/arm gestures may be used to perform the painting of the virtual elements 522, 542 of the virtual objects 520, 540, respectively. Interaction with the virtual objects 520, 540 in this natural manner may provide the user with an enhanced virtual experience. The painting of the virtual objects 520, 540 may include a relatively large number of relatively small, incremental gestures. Each of these relatively small, incremental gestures may correspond to an individual input command related to the painting of the virtual object 520, 540, as noted above. In some situations, the user may issue a supplementary command to reverse the execution of some of these commands, for example, a sequence or series of these commands. Similarly, in some situations, the user may issue a supplementary command to re-execute commands, for example, a sequence or series of commands that have been previously reversed. In some situations, the user may issue a supplementary command to re-play some of these commands, for example, a sequence or series of these commands. In some instances, the user may wish to reverse, and/or re-execute, and/or re-play a sequence, or series, or batch of these commands, rather than reversing and/or re-executing and/or re-playing each individual command respectively representing a corresponding relatively small, incremental gesture individually, to provide a more natural, continuous virtual experience.

The supplementary command reversing and/or re-executing and/or re-playing batch(es) of commands may typically be directed to a group, or series, or sequence, or batch, of commands, rather than an individual, relatively small, incremental command. Reversal and/or re-execution and/or re-play of individual commands may require excessive user input to achieve a desired result, such as, for example, an un-do, or a reversal, of the painting of the virtual element 522, 542 of the virtual object 520, 540. Reversal and/or re-execution and/or re-play of individual commands to, for example, perform un-do, or a reversal, of the painting of the virtual element 522, 542 of the virtual object 520, 540 may provide a somewhat disjointed, or disconnected, virtual experience.

In some implementations, a sequence, or series, or group, of these relatively small, incremental commands may be intelligently batched in an ordered stack, such as, for example, the batches C1, C2, C3, C4 shown in FIG. 5A, for reversal and/or re-execution and/or re-play. Intelligent batching of the commands for reversal and/or re-execution and/or re-play may facilitate effective user interaction with a selected virtual object, and may provide the user with a more continuous, connected virtual experience.

In some implementations, commands may be intelligently batched into an ordered stack for reversal and/or re-execution and/or re-play based on a temporal window in which the command(s) are detected. Temporal windows may encompass a set interval of time in the virtual experience, with command(s) detected within that set interval of time assigned to a batch associated with that temporal window. In some implementations, the temporal window may be a moving, or sliding temporal window. The sliding temporal window may be defined by a set interval of time (e.g., a set duration), with a start and end point of the temporal window being substantially continuously redefined as time in the virtual environment progresses.

In some implementations, commands may be intelligently assigned to a batch, in an ordered stack, for reversal and/or re-execution and/or re-play based on a particular type of command detected. For example, in the virtual painting example illustrated in FIGS. 4A-4E, as the user interacts with virtual object(s) in the virtual environment 500, for example, the virtual object(s) 520, 540, commands input by the user may be detected. The system may analyze each detected command, and determine an associated type or category for each detected command. The commands may then be assigned to a particular batch based on a common type, or category of command. In some implementations, intelligent batching of commands based on type or category of command may be performed for commands detected within a temporal window as described above. In some implementations, an operational type or category may include, for example, a painting command, a drawing command, a movement command, a scaling command, a notation command, a calculation command, a cut/paste command, and other such commands which may be applied to a virtual object in the virtual environment.

In some implementations, commands may be intelligently assigned to a batch, in an ordered stack, for reversal and/or re-execution and/or re-play based on a spatial position at which the command is detected in the virtual environment 500. For example, in the virtual painting example illustrated in FIGS. 4A-4E, as the user interacts with virtual object(s) in the virtual environment 500, for example, the virtual object(s) 520, 540, commands input by the user may be detected. They system may analyze each detected command, and determine an associated spatial position for each detected command. The commands may then be assigned to a particular batch based on one or more previously defined spatial areas (e.g., a spatial volume) within the virtual environment. In some implementations, intelligent batching of commands based on spatial position at which the command is detected may be performed for commands detected within a temporal window as described above, and/or together with assignment to a batch based on a detected operational type or category of command.

In some implementations, the system may un-do a batch of commands based on the intelligent assignment of detected commands to these batches, or ordered stacks of commands as described above. For example, a user presented with the virtual environment 500 as shown in FIG. 4E, including the virtual elements 522, 542 in the painted state, may input a first un-do command, to reverse the execution of, for example, a first batch of commands. The first batch of commands to be undone in response to the first un-do command may correspond to the most recent batch of commands executed, based on the intelligent batching. For example, in some implementations, in response to the first un-do command, the system may reverse, or un-do the first (most recently executed) batch C4 of commands, so that the painting of the virtual element 542 is partially reversed and the virtual environment 500 is presented to the user as shown in FIG. 4D. A second un-do command may cause the system to reverse, or un-do, the next most recent batch C3 of commands, so that the painting of the virtual element 542 is then fully reversed and the virtual environment 500 is presented to the user as shown in FIG. 4C.

In another example, the batches of commands may be further batched, based on, for example, a virtual object or element associated with the batches of commands. For example, in some implementations, based on system settings, in response to the first un-do command, the system may reverse the batch(es) C4, C3 of commands associated with the painting of the virtual element 542. In this example, the painting of the virtual element 542 would be reversed in response to a single un-do command, and the virtual environment 500 is presented to the user as shown in FIG. 4C in response to a single un-do command.

In these examples, the entire batch(es) C4 of commands would be reversed simultaneously, rather than the individual reversal of the relatively large number of individual commands involved in the painting of the virtual element 542. Subsequent un-do commands may cause the system to, for example, reverse the painting of the virtual element 522. For example, the system may reverse the partial painting of the virtual element 522 by reversing the batch C2 of commands, and then fully reverse the painting of the virtual element 522 by reversing the batch C1 of commands. In some implementations, the system may fully reverse the painting of the virtual element 522 by reversing the batches C1 and C2 of commands simultaneously, rather than sequentially. In these examples, the entire batch(es) of commands (either the batch C2 followed by the batch C1, or the batches C2 and C1 together) would be reversed simultaneously, rather than the individual reversal of the relatively large number of individual commands involved in the painting of the virtual element 522.

In some implementations, the system may re-do a batch of commands based on the intelligent assignment of detected commands to these batches, or ordered stacks of commands as described above. For example, the system may re-execute, or re-do batch(es) of previously undone commands (as described above). If a first re-do command is detected, the system may re-execute the most recently undone batch of commands. In this example, the system may re-execute the commands associated with painting the virtual element 522. Depending on system settings, this may include re-executing commands assigned to the batch C1 (so that the virtual environment 500 would once again appear as shown in FIG. 4B), or commands assigned to the batches C1 and C2 (so that the virtual environment 500 would once again appear as shown in FIG. 4C). In this example, the batch(es) of commands would be re-executed simultaneously, rather than the individual re-execution of the relatively large number of individual commands involved in the painting of the virtual element 522. Subsequent re-do commands may be executed by the system in a similar manner.

In some implementations, the system may re-play a batch of commands based on the intelligent assignment of detected commands to these batches, or ordered stacks of commands as described above. For example, the system may re-play batch(es) of previously executed commands, to illustrate to the user the execution of the sequence of commands. In some implementations, the re-play command may be associated with a single batch of commands intelligently assigned to the batch as described above. In some implementations, the re-play command may be associated with multiple batches of commands intelligently assigned to the respective batches as described above. In some implementations, the user may select a start point and/or an end point associated with the re-play command. In some implementations, the start point and/or the end point may be temporally based. In some implementations, the start point and/or the end point may be based on a particular virtual object to which the batches of commands are directed for execution.

For example, a first re-play command may visually re-play the execution of commands associated with the user's interactions with the first virtual object 520, such as, for example, the painting of the virtual element 522. This may include commands assigned to the batches C1 and C2 included in the painting of the virtual object 522, from FIG. 4A through FIG. 4C. A second re-play command may visually re-play the execution of commands associated with the user's interactions with the second virtual object 540. This may include commands assigned to the batches C3 and C4 included in the painting of the virtual element 542, from FIG. 4C through FIG. 4E. A third re-play command may visually re-play the execution of commands associated with the user's interactions associated with painting in the virtual environment 500, including painting of the first virtual object 520 and the second virtual object 540. This may include a re-play of the commands assigned to the batches C1, C2, C3 and C4, from FIG. 4A through FIG. 4E.

As noted above, in some implementations, detected commands may be intelligently assigned to a batch based on a temporal window in which the commands are detected. For example, a temporal window, or interval may be previously set (for example, by the manufacturer, by the developer, by the user, and the like), and any commands detected within a temporal window may be assigned to the same batch. In the example shown in FIG. 5A, commands detected within the temporal window extending from time t0 to time t1 are assigned to the batch C1. Similarly, commands detected within the temporal window extending from time t1 to time t2 are assigned to the batch C2, commands detected within the temporal window extending from time t2 to time t3 are assigned to the batch C3, and commands detected within the temporal window extending from time t3 to time t4 are assigned to the batch C4.

In some implementations, the temporal window(s) may be moving, or sliding temporal windows. For example, a temporal window, or interval may be previously selected (for example, by the manufacturer, by the developer, by the user, and the like). The temporal windows may move, or slide, as time progresses. The movement, or sliding, of the temporal windows, may cause the detected commands to be re-assigned to different batch(es) as the windows move, or slide. As shown in FIG. 5B, detected commands may be assigned to a current batch Ccurr, based on a previously defined current temporal window, or temporal interval. As time progresses, the current temporal window moves, and the current batch Ccurr also moves. In this example, the current batch Ccurr captures commands detected back to within the set interval of time. Thus, the commands assigned to the current batch Ccurr essentially constantly changes, as do the commands assigned to previous batch(es) Cprev.

As noted above, in some implementations, detected commands may be intelligently assigned to a batch based on an operational type associated with the detected command. For example, in some implementations, the painting commands may be assigned to the same batch, or a series of associated batches, as all of the commands illustrated in FIGS. 4A-4E are associated with the same operational type of command (painting).

If, for example, the user were to implement commands related to a different operational type of command, the system may assign these commands to a different batch, or series of associated batches, of commands. For example, command associated with moving one or more virtual elements in the virtual environment 500, and/or adding one or more new virtual elements to the virtual environment 500, and/or deleting one or more virtual elements from the virtual environment 500, may be assigned to different batch(s) of commands, based on the operational type associated with each detected command. In some implementations, the order in which batches of commands may be undone/redone/replayed as described above may be executed based on an established hierarchy.

In some implementations, batches of commands may be undone/redone/replayed based primarily on their operational type, for example, corresponding to the current operational type of a command currently being implemented by the user, or last implemented by the user. In some implementations, batches of commands may be undone/redone/replayed based on their temporal detection, and then further based on operational type. Batches of commands may be undone/redone/replayed based on their operational type, and then further based on their temporal detection.

As noted above, in some implementations, detected commands may be intelligently assigned to a batch based on a spatial position at which the command is detected in the virtual environment 500. For example, in some implementations, command(s) detected in a first spatial area of the virtual environment 500 may be assigned to a first batch of commands, and command(s) detected in a second spatial area of the virtual environment 500 may be assigned to a second batch of commands. In the example shown in FIGS. 4A-4E, the first spatial area may correspond to, for example, the first virtual object 520 (the virtual space occupied by the tree 520), and the second spatial area may correspond to the second virtual object 540 (the virtual space occupied by the house 540).

In some implementations, the order in which batches of commands may be undone/redone/replayed as described above may be executed based on an established hierarchy. In some implementations, batches of commands may be undone/redone/replayed based primarily on the spatial, for example, corresponding to the current spatial position associated with a command currently implemented by the user, or last implemented by the user. In some implementations, batches of commands may be undone/redone/replayed based on their temporal detection, and/or then further based spatial detection position, and/or then further based on operational type, and or combinations thereof based on an established hierarchy.

Figure 6:
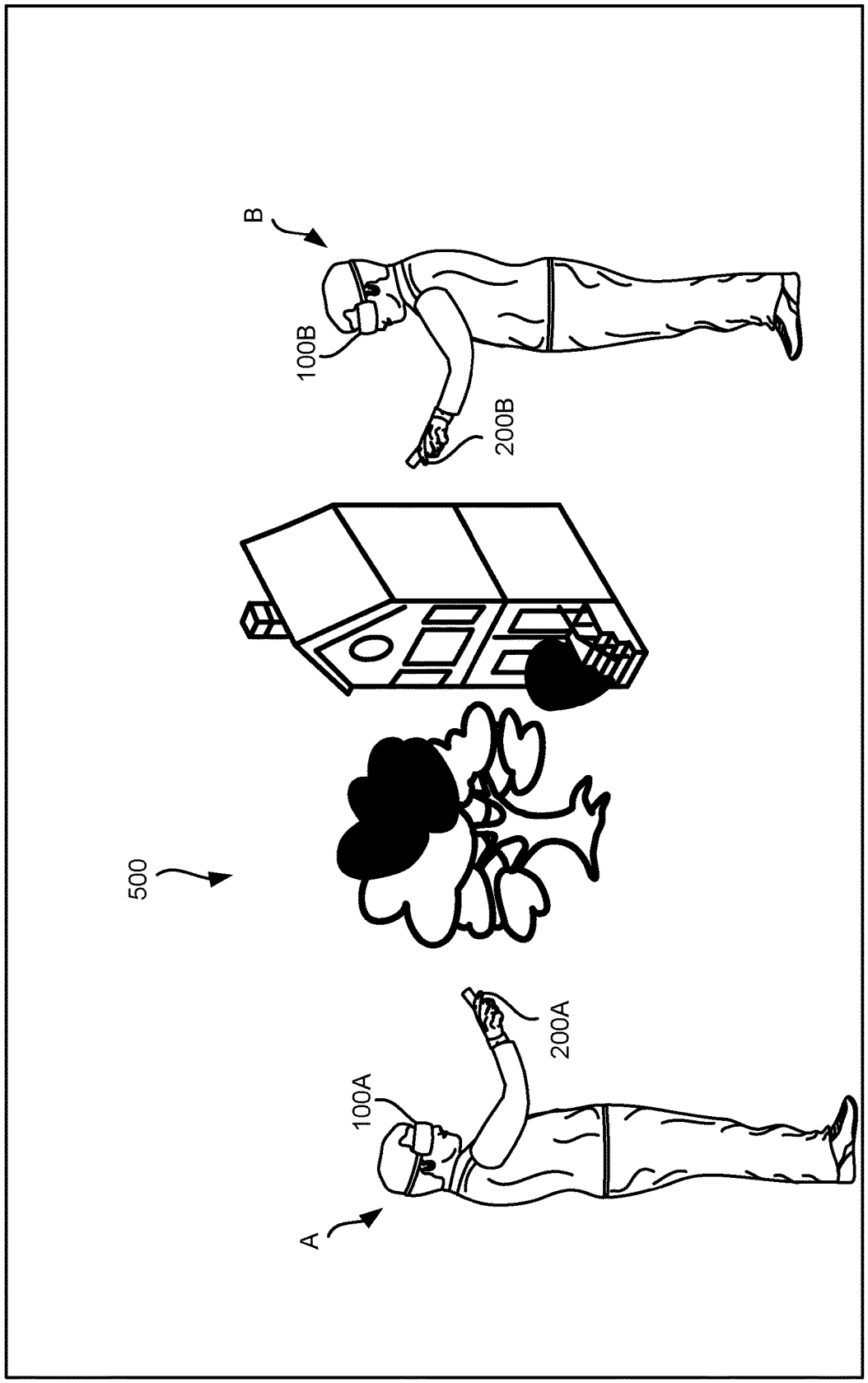
FIG. 6 illustrates multiple users in a shared virtual environment, in accordance with implementations described herein.

The intelligent batching of commands detected in the virtual environment 500 as described above may provide added benefit in a situation in which multiple users share the same virtual environment 500. FIG. 6 is a third person view of multiple users A and B in a shared virtual environment 500. As noted above, the virtual environment 500 would be visible to the users A and B within the HMDs 100A and 100B worn by the user(s), but is shown outside of the HMDs 100A, 100B, for ease of discussion and illustration.

Multiple users, such as the first user A and the second user B shown in FIG. 6, may share the virtual environment 500 to, for example, provide collaborative input, interact in a virtual work environment, and other such purposes. In a situation in which multiple users implement commands in the virtual environment 500 simultaneously, commands may be intelligently batched as described above, to facilitate the reversal and/or re-execution and/or replay of commands by batch(es), rather than individually. For example, commands may intelligently batched based on the spatial position at which they are detected, and associated with a particular one of the users. Batches of commands may be undone/redone/replayed in accordance with an established hierarchy based on one or more of by user, by temporal (moving window), by spatial detection position in the virtual environment and/or by operational type of command.

This intelligent batching of commands may facilitate the intelligent execution of commands, implemented by multiple users, substantially simultaneously, for execution in association with the same virtual object. For example, the user A and the user B may share the virtual environment 500, and may be working collaboratively with respect to the virtual object 520. The user A may implement a first series of commands (corresponding to a relatively large number of relatively small, incremental inputs as described above) related to painting the virtual object 520. Substantially simultaneously, the user B may implement a second series of commands (corresponding to a relatively large number of relatively small, incremental inputs as described above) related to movement of the virtual object 520. By intelligently batching the first series of commands implemented by the user A, and batching the second series of commands implemented by the user B, the virtual object 520 may be painted as intended by the user A in response to the first (batched) series of commands, and may be moved as intended by the user B in response to the second (batched) series of commands. Without the intelligent batching of commands as described above, the individual commands (small, incremental inputs) received by the system may be inconsistently applied to the virtual object 520, inaccurately reflecting the intended result from the inputs implemented by the user A, and inaccurately reflecting the intended result from the inputs implemented by the user B. This intelligent batching may also reduce system workload, as only a first command (representing the first batch of commands implemented by the user A) and a second command (representing the first batch of commands implemented by the user B) are processed, rather than the relatively large number of commands included in each of the first and second batches of commands.

In a system and method, in accordance with implementations described herein, user commands detected in an augmented and/or virtual reality environment may be intelligently batched based on one or more of a temporal window in which the command(s) are detected in the virtual environment 500, a moving or sliding temporal window in which the commands are detected in the virtual environment 500, an operational type of the command detected in the virtual environment 500, and/or a spatial position at which the command(s) are detected in the virtual environment 500. This intelligent batching may facilitate the reversal and/or re-execution and/or re-play of commands in batches, rather than individually, to enhance the user's virtual experience.

Figure 7:
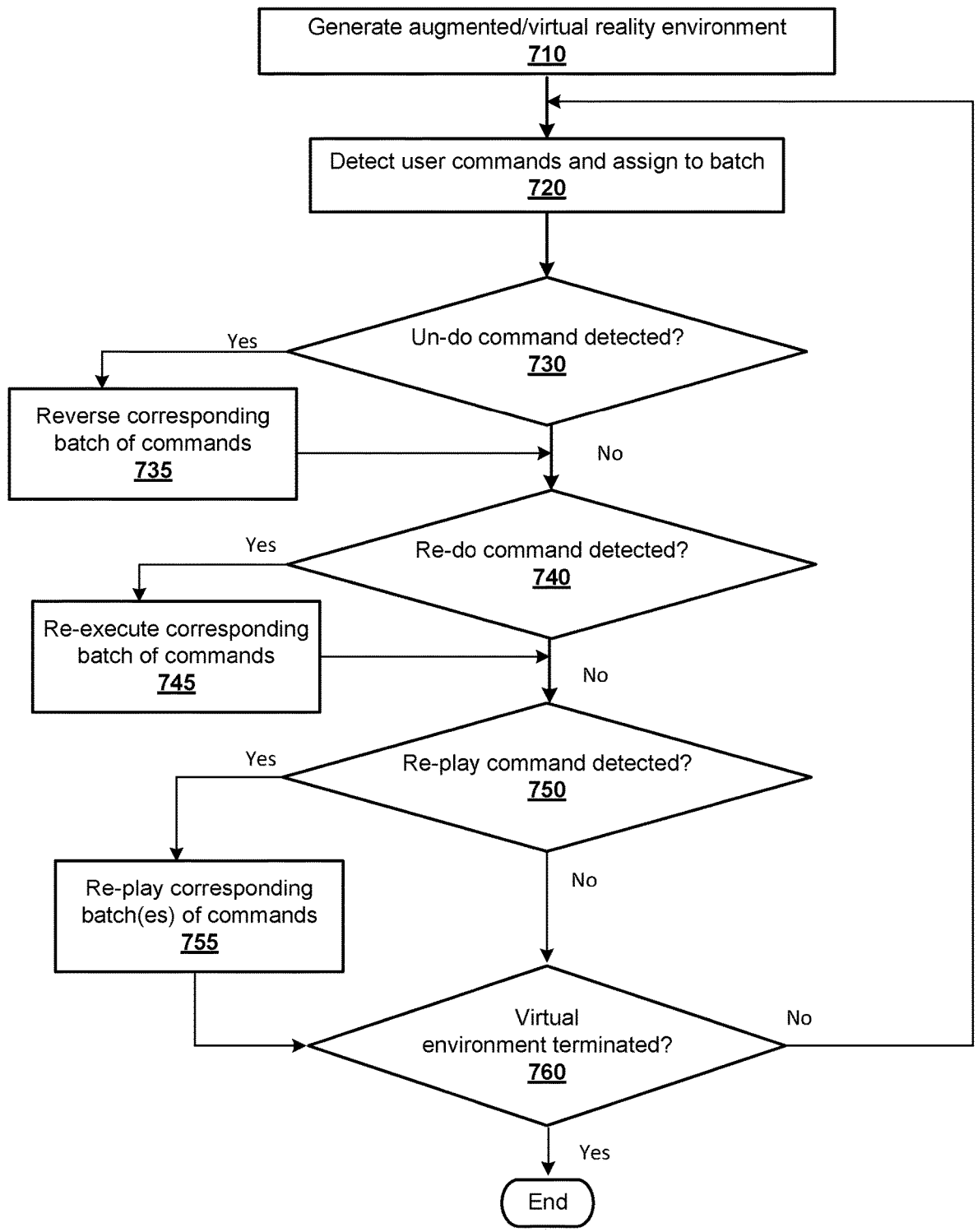
FIG. 7 is a flowchart of a method, in accordance with implementations as described herein.

A method 700 of detecting an end of a virtual session in an augmented and/or virtual reality environment, in accordance with implementations as described herein, is shown in FIG. 7. One or more users may initiate an augmented reality experience and/or a virtual reality experience using, for example, a computing device such as, for example, a system including a HMD device as described above, which may be operably coupled with, or paired with, one or more external devices, to generate the augmented reality and/or virtual reality environment (block 710). The system may detect commands input by the one or more users, for interaction with a virtual object or element of the virtual environment, and may assign the detected commands to a batch (block 720), as described above in detail with respect to FIGS. 4A-4E, 5A-5B and 6. In response to an un-do command (block 730), the system may reverse the execution of one or more batches of previously executed commands (block 735), as described above n detail with respect to FIGS. 4A-4E, 5A-5B and 6. In response to a re-do command (block 740), the system may re-execute one or more batches of previously undone commands (block 745), as described above n detail with respect to FIGS. 4A-4E, 5A-5B and 6. In response to a replay command (block 750), the system may re-play one or more batches of previously executed commands (block 755), as described above n detail with respect to FIGS. 4A-4E, 5A-5B and 6. The process may continue until it is determined that the current augmented reality and/or virtual reality experience has been terminated (block 760).

In a system and method, in accordance with implementations described herein, an end of a virtual session, or a temporary suspension of a virtual session, may be detected based on a set gesture that does not involve specific user input or intervention. Follow on processing, and/or supplemental tasking, based on user interactions during the virtual session, may be automatically initiated by the system in response to the detected end of the virtual session, without separate user intervention or manual input to initiate processing, making productive use of available time and computing resources.

Figure 8:
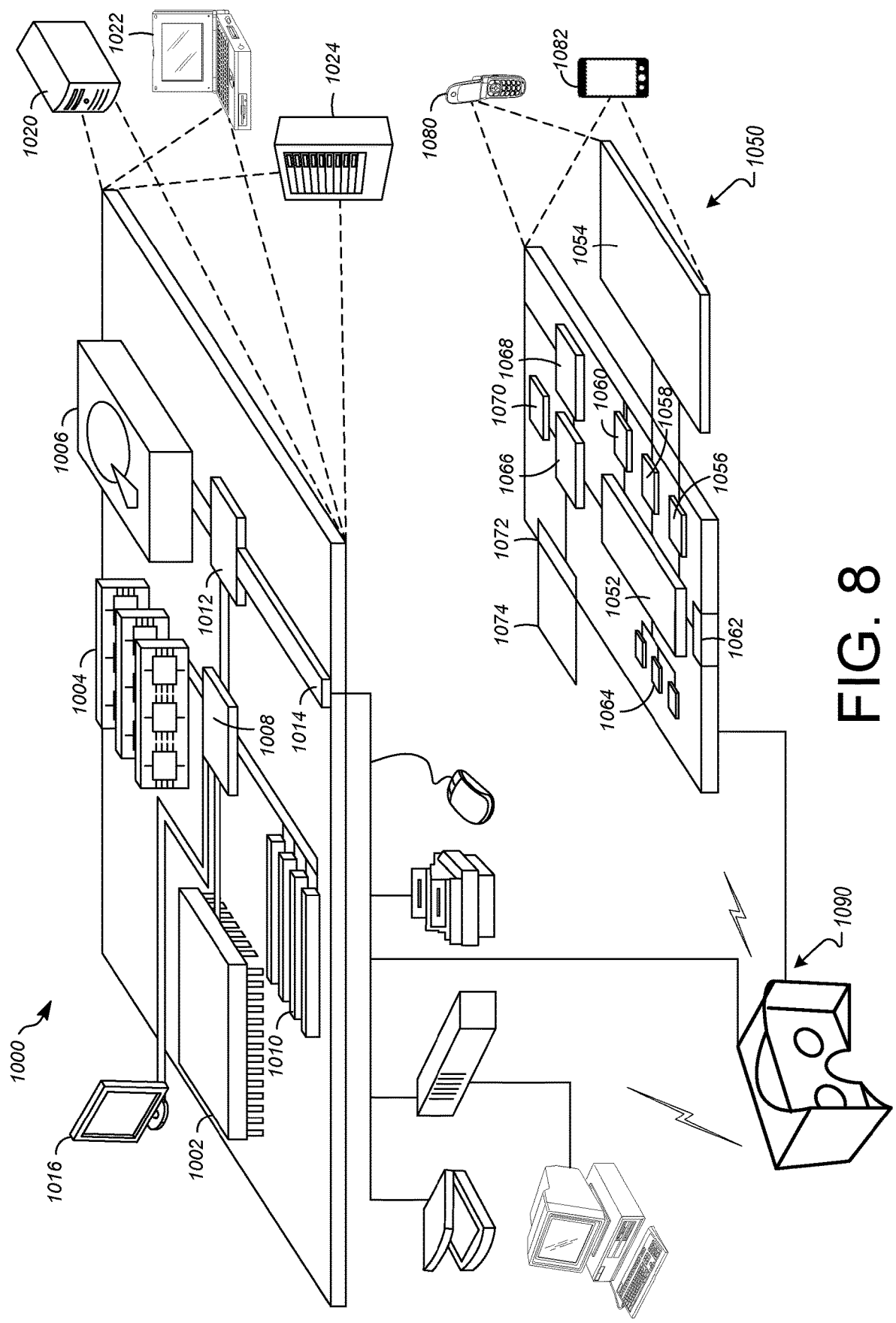
FIG. 8 shows an example of a computer device and a mobile computer device that can be used to implement the techniques described herein.

FIG. 8 shows an example of a computer device 1000 and a mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with a virtual reality (VR headset/HMD device 1090). For example, one or more sensors included on a computing device 1050 or other computing device depicted in FIG. 10, can provide input to VR headset 1090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the VR space that can then be used as input to the VR space. For example, the computing device 1050 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the VR space can cause a particular action to occur in the VR space.

In some implementations, a touchscreen of the computing device 1050 can be rendered as a touchpad in VR space. A user can interact with the touchscreen of the computing device 1050. The interactions are rendered, in VR headset 1090 for example, as movements on the rendered touchpad in the VR space. The rendered movements can control virtual objects in the VR space.

In some implementations, one or more output devices included on the computing device 1050 can provide output and/or feedback to a user of the VR headset 1090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the VR space. In the example of the laser pointer in a VR space, the computing device 1050 appears as a virtual laser pointer in the computer-generated, 3D environment. As the user manipulates the computing device 1050, the user in the VR space sees movement of the laser pointer. The user receives feedback from interactions with the computing device 1050 in the VR environment on the computing device 1050 or on the VR headset 1090.

In some implementations, a computing device 1050 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
    detecting, in a three dimensional (3D) virtual environment generated by a computing device, a plurality of commands to be executed in the virtual environment, wherein at least one of the detected commands is a 3D input detected in a spatial volume of the 3D virtual environment;
    executing the plurality of commands;
    assigning each command of the plurality of commands to a batch, of a plurality of batches, including, for each command of the plurality of commands:
        in a first mode, assigning the command to the batch based on a moving temporal window associated with the detection of the command,
        in a second mode, assigning the command to the batch based on a classification of an operation to be executed in connection with the command, and
        in a third mode, assigning the command to the batch based on a spatial position in the 3D virtual environment associated with the detection of the command;
    executing a supplementary command associated with at least one of the plurality of batches of commands; and
    executing the supplementary command.

2. The method of claim 1, wherein executing the supplementary command includes:
    detecting an un-do command;
    identifying an un-do batch, of the plurality of batches, associated with the un-do command; and
    reversing a previous execution of commands associated with the identified un-do batch.

3. The method of claim 2, wherein executing the supplementary command includes:
    detecting a re-do command;
    identifying a re-do batch, of the plurality of batches, associated with the re-do command; and executing commands associated with the identified re-do batch.

4. The method of claim 3, wherein executing commands associated with the identified re-do batch includes re-executing a batch of previously reversed commands associated with an un-do batch of commands.

5. The method of claim 1, wherein executing the supplementary command includes:
detecting a re-play command;
identifying a range of commands, of the plurality of commands, included in the re-play command;
identifying a beginning command corresponding to a first command of the range of commands to be re-played;
identifying an end command corresponding to a last command of the range of commands to be re-played; and
sequentially executing the range of commands, from the first command to the last command.

6. The method of claim 5, wherein the re-play command includes one or more batches of the plurality of batches of commands.

7. The method of claim 5, wherein sequentially executing the range of commands includes re-executing one or more batches, of the plurality of batches of commands, of previously reversed commands associated with one or more un-do batches of commands.

8. The method of claim 1, wherein the assigning of the command to the batch in the first mode includes assigning each command of the plurality of commands to the batch of the plurality of batches based on the moving temporal window associated with the detection of the command, including:
monitoring time associated with interaction in the virtual environment;
assigning commands detected within a set window of time to a current temporal window;
re-setting the current temporal window at set time intervals; and
updating the commands assigned to the current temporal window based on the re-set temporal window.

9. The method of claim 1, wherein the assigning of the command to the batch in the second mode includes assigning each command of the plurality of commands to the batch of the plurality of batches based on the classification of an operation to be executed in connection with the command, including:
detecting an operational category, of a plurality of operational categories, associated with each of the detected commands;
assigning each of the detected commands to a batch corresponding to the detected operational category; and
identifying a batch, of the plurality of batches of commands for execution.

10. The method of claim 9, wherein executing the supplementary command includes:
detecting the supplementary command;
identifying the operational category associated with the detected supplementary command; and
executing the supplementary command including the batch of commands assigned to the corresponding operational category.

11. The method of claim 1, wherein the assigning of the command to the batch in the third mode includes assigning each command of the plurality of commands to the batch of the plurality of batches based on the spatial position in the 3D virtual environment associated with the detection of the command, including:

setting a plurality of spatial areas in the virtual environment, each of the plurality of spatial areas being defined by respective set of spatial boundaries; and
assigning each of the detected commands to a corresponding spatial area based on a detection position of the command within the corresponding spatial area.

12. The method of claim 11, wherein executing the supplementary command includes:
detecting the supplementary command;
identifying the spatial area associated with the detected supplementary command; and
executing the supplementary command including the batch of commands assigned to the corresponding spatial area.

13. The method of claim 1, wherein detecting the plurality of commands includes:
detecting a first plurality of commands issued by a first user, wherein the first plurality of commands are directed for execution with respect to a virtual object in the virtual environment;
assigning the first plurality of commands to a first batch;
detecting a second plurality of commands issued by a second user, wherein the second plurality of commands are directed for execution with respect to the virtual object in the virtual environment; and
assigning the second plurality of commands to a second batch.

14. The method of claim 13, wherein
detecting the first plurality of commands issued by the first user includes detecting the first plurality of commands in a first spatial area of the virtual environment, and
detecting the second plurality of commands issued by the second user includes detecting the second plurality of commands in a second spatial area of the virtual environment.

15. The method of claim 14, wherein executing the supplementary command includes:
detecting the supplementary command in the first spatial area of the virtual environment or in or the second spatial area of the virtual environment;
executing the supplementary command in accordance with the first batch in response to detection of the supplementary command in the first spatial area; and
executing the supplementary command in accordance with the second batch in response to detection of the supplementary command in the second spatial area.

16. A computer program product comprising a non-transitory computer readable medium, the non-transitory computer readable medium having stored thereon a sequence of instructions which, when executed by a processor, causes the processor to execute a method, the method comprising:
detecting, in a three dimensional (3D) virtual environment generated by a computing device, a plurality of commands to be executed in the virtual environment, wherein at least one of the detected commands is a 3D input detected in a spatial volume of the 3D virtual environment;
executing the plurality of commands;
assigning each command of the plurality of commands to a batch, of a plurality of batches, including, for each command of the plurality of commands:
in a first mode, assigning the command to the batch based on a moving temporal window associated with the detection of the command, in a second mode, assigning the command to the batch based on a classification of an operation to be executed in connection with the command, and in a third mode, assigning the command to the batch based on a spatial position in the 3D virtual environment associated with the detection of the command; and executing a supplementary command associated with at least one of the plurality of batches of commands.

17. A computer program product comprising a non-transitory computer readable medium, the non-transitory computer readable medium having stored thereon a sequence of instructions which, when executed by a processor, causes the processor to execute a method, the method comprising:

generating a three dimensional (3D) virtual environment;

detecting a plurality of commands to be executed in the virtual environment, wherein at least one of the detected commands is a 3D input detected in a spatial volume of the 3D virtual environment;

assigning each command of the plurality of commands to a batch, of a plurality of batches, including, for each command of the plurality of commands:

in a first mode, assigning the command to the batch based on a moving temporal window associated with the detection of the command, in a second mode, assigning the command to the batch based on a classification of an operation to be executed in connection with the command, and in a third mode, assigning the command to the batch based on a spatial position in the 3D virtual environment associated with the detection of the command;

detecting a supplementary command associated with at least one of the plurality of batches of commands; and executing the supplementary command.

18. The computer program product of claim 17, wherein detecting the supplementary command and executing the supplementary command includes at least one of:

detecting and executing an un-do command, including:
identifying an un-do batch, of the plurality of batches, associated with the un-do command; and
reversing a previous execution of commands associated with the identified un-do batch;

detecting and executing a re-do command, including:
identifying a re-do batch, of the plurality of batches, associated with the re-do command; and
executing commands associated with the identified re-do batch, including re-execution one or more previously undone commands; or detecting and executing a re-play command, including:
identifying a range of commands, of the plurality of commands, included in the re-play command, the range of commands including one or more batches, of the plurality of batches; and
sequentially executing the range of commands, including re-executing one or more batches, of the plurality of batches of commands, of previously reversed commands associated with one or more un-do batches of commands.

19. The computer program product of claim 17, wherein the assigning of the command to the batch in the first mode includes assigning of each command of the plurality of commands to the batch of the plurality of batches based on the moving temporal window associated with the detection of the command, including:

monitoring time associated with interaction in the virtual environment;

assigning commands detected within a set window of time to a current temporal window;

re-setting the current temporal window at set time intervals; and updating the commands assigned to the current temporal window based on the re-set temporal window.

20. The computer program product of claim 17, wherein the assigning of the command to the batch in the second mode includes assigning each command of the plurality of commands to the batch of the plurality of batches based on the classification of an operation to be executed in connection with the command, including:

detecting an operational category, of a plurality of operational categories, associated with each of the detected commands;

assigning each of the detected commands to a batch corresponding to the detected operational category; and identifying a batch, of the plurality of batches of commands for execution; and the executing of the supplementary command includes:

identifying the operational category associated with the detected supplementary command; and executing the supplementary command including the batch of commands assigned to the corresponding operational category.

21. The computer program product of claim 17, wherein the assigning of the command to the batch in the third mode includes assigning each command of the plurality of commands to the batch of the plurality of batches based on the spatial position in the 3D virtual environment associated with the detection of the command, including:

setting a plurality of spatial areas in the virtual environment, each of the plurality of spatial areas being defined by respective set of spatial boundaries; and assigning each of the detected commands to a spatial area based on a detection position of the command within a corresponding spatial area; and the executing of the supplementary command includes:

identifying the spatial area associated with the detected supplementary command; and executing the supplementary command including the batch of commands assigned to the corresponding spatial area.

* * * * *

UNITED STATES PATENT AND TRADEMARK OFFICE
CERTIFICATE OF CORRECTION

PATENT NO. : 10,698,561 B2
APPLICATION NO. : 15/620326
DATED : June 30, 2020
INVENTOR(S) : MacGillivray Page 1 of 1

It is certified that error appears in the above-identified patent and that said Letters Patent is hereby corrected as shown below:

In the Claims

In Column 22, Claim 19, Line 6, delete "of each" and insert -- each --, therefor.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*